US008930398B1

(12) United States Patent
Kishore et al.

(10) Patent No.: US 8,930,398 B1
(45) Date of Patent: Jan. 6, 2015

(54) SYSTEM AND METHOD FOR IMPROVING A RESUME ACCORDING TO A JOB DESCRIPTION

(71) Applicant: Careerimp, Inc., Chicago, IL (US)

(72) Inventors: Ayan Kishore, Chicago, IL (US); Paul A. Sutcliffe, Jr., Pittsburg, PA (US)

(73) Assignee: Careerimp, Inc., Chicago, IL (US)

( * ) Notice: Subject to any disclaimer, the term of this patent is extended or adjusted under 35 U.S.C. 154(b) by 72 days.

(21) Appl. No.: 13/648,659

(22) Filed: Oct. 10, 2012

Related U.S. Application Data

(60) Provisional application No. 61/545,838, filed on Oct. 11, 2011.

(51) Int. Cl.
*G06F 17/30* (2006.01)
*G06F 3/0482* (2013.01)

(52) U.S. Cl.
CPC .... *G06F 17/30654* (2013.01); *G06F 17/30958* (2013.01); *G06F 3/0482* (2013.01)
USPC .......................................... 707/780; 707/733

(58) Field of Classification Search
CPC G06F 17/30958; G06F 3/0482; G06F 3/0489
USPC ............ 707/748, 10, 741, 722, 767, 723, 750
See application file for complete search history.

(56) References Cited

U.S. PATENT DOCUMENTS

| | | | | |
|---|---|---|---|---|
| 6,460,036 | B1 * | 10/2002 | Herz | 707/748 |
| 7,970,912 | B2 * | 6/2011 | Bourne | 709/227 |
| 8,051,102 | B2 * | 11/2011 | Everett | 707/793 |
| 8,103,679 | B1 * | 1/2012 | Cranfill et al. | 707/750 |
| 2008/0086366 | A1 * | 4/2008 | Concordia et al. | 705/11 |
| 2009/0055404 | A1 * | 2/2009 | Heiden et al. | 707/10 |
| 2010/0070492 | A1 * | 3/2010 | Dattatri et al. | 707/722 |
| 2010/0324970 | A1 * | 12/2010 | Phelon et al. | 705/10 |
| 2011/0040753 | A1 * | 2/2011 | Knight | 707/733 |
| 2011/0119276 | A1 * | 5/2011 | Borghetti et al. | 707/748 |
| 2011/0276506 | A1 * | 11/2011 | Schmitt | 705/321 |
| 2011/0276582 | A1 * | 11/2011 | Schmitt | 707/767 |
| 2012/0215795 | A1 | 8/2012 | Phelon et al. | |
| 2012/0246168 | A1 * | 9/2012 | Srivastava et al. | 707/741 |
| 2013/0031090 | A1 * | 1/2013 | Posse et al. | 707/723 |
| 2013/0218794 | A1 * | 8/2013 | Scott et al. | 705/321 |

* cited by examiner

*Primary Examiner* — James Trujillo
*Assistant Examiner* — Thong Vu
(74) *Attorney, Agent, or Firm* — Lowenstein Sandler LLP

(57) ABSTRACT

The present invention relates to a system and method for improving a resume according to a job description, including generating a first user profile signature based on a first user profile element associated with a user, generating a first job description signature based on a first job description element associated with a job description; and comparing the first user profile signature with the first job description signature to determine a first score indicating a strength of a match between the first user profile element and the job description.

18 Claims, 8 Drawing Sheets

RESUME SERVICE PROVIDER NAME

Import Options

Contact information

Name: John Doe
Address: 123 Main Street
Anywhere, State, zip code

Email: johndoe@emailaddress.com

Telephone: 012-345-6789

Social Business Network Link

Import from Network Link

Upload resume

Work Experience | Dir. of Sales & Marketing

Organization | XYZ Corporation

Profile Elements | Contributed to business development efforts for technology start-up developing web based career guidance tools for job seekers Acceptance tested the product "Name-of-product" before rolling it out for every university customer Set up a sales process for |

152 Graphical User Interface (GUI)

Fig. 3

600

US 8,930,398 B1

SYSTEM AND METHOD FOR IMPROVING A RESUME ACCORDING TO A JOB DESCRIPTION

CROSS-REFERENCE TO RELATED APPLICATIONS

The present application claims the benefit, pursuant to the provisions of 35 U.S.C. 119, of U.S. Provisional Application Ser. No. 61/545,838, titled "System and Methodology For Improving a Resume According to a Job Description", filed on Oct. 11, 2011, which is herein incorporated by reference.

FIELD OF THE INVENTION

The present invention relates generally to a system and a method for resume services, more particularly to a system and method for improving a resume according to a job description.

BACKGROUND OF THE INVENTION

A resume enables a jobseeker to articulate his or her skills and experiences in ways relevant to particular job opportunities. Resumes are scanned and sorted by recruiters or employers manually or using automated systems to determine relevancy of candidates for a particular position the employer is seeking to fill. Candidates possessing top-ranked resumes are the ones that get called for subsequent interviews. There is no surprise then that it is common practice for jobseekers to focus or customize the content of their resumes based on the nature of the jobs they are interested in so that the resume is more relevant for purposes of employer screenings.

The problem is that there is no system designed to enable content focusing of a resume based on the requirements of a particular job. Existing systems range from word processors to web-based resume builders that enable users to compose or build a single, general or all-purpose resume. The level of customization supported by such existing systems is usually directed only to applying different formatting styles or changing the look and feel of the resume automatically.

The approach that most jobseekers use for focusing their resume is to use one of the existing systems to build a resume, then make a copy of that resume and edit it to manually remove, add or paraphrase content based on what the user perceives is relevant or not for that job opportunity based on their understanding of the job description. Users that follow this process end up having several different resumes which they then use to copy relevant content from and paste into a new resume for a particular job, making focusing a resume tedious and time-consuming.

Yet another problem is the qualitative nature of resume reviews. As a result of the ambiguity for jobseekers in how employers perceive resumes, a large number of jobseekers count on reviewers and resume writers (i.e., humans) to suggest content changes in their resume so that it is more focused for the job or position type they are after. The suggestions of different resume reviewers, who in turn basically perform similar objective processes as jobseekers, typically generate inconsistent results.

SUMMARY OF THE INVENTION

The above-described problems are addressed and a technical solution is achieved in the art by the system and methodology for generating a resume according to a job description described herein. In an embodiment, the system may automate the evaluating of content and content changes. The system may score how relevant the content in a resume is to a particular job. This instigates jobseekers to paraphrase or modify content that scores low to see how it changes the overall score, thus providing a systematic mechanism for accurately evaluating changes to resume content.

One or more embodiments of the present invention are capable of automating selection of content for focusing a resume. The system may determine how relevant every part of a resume is compared to a job description and select the most relevant parts of the resume for generating a focused resume.

In an embodiment, the system may provide content suggestions by comparing a job description and a resume to identify what type of information is missing in the resume for the job. In an embodiment, the system further compares the user's resume data with others on the system and/or other identified on external sources (e.g., with resume data of those already holding the desired job or a similar position) to identify similar content that better matches the job description and then provides these as examples to the user to add to, modify, and/or paraphrase their resume content. For example, the system may suggest alternative synonymous titles for previously held positions to make the resume more relevant to a particular job opportunity/posting, or identify educational coursework to complement a resume for a particular job opportunity/posting.

BRIEF DESCRIPTION OF THE DRAWINGS

The present invention will be more readily understood from the detailed description of embodiments presented below considered in conjunction with the attached drawings, of which:

FIG. 3 shows an example graphical user interface for improving a resume according to a job description according to an embodiment of the present invention;

It is to be understood that the attached drawings are for purposes of illustrating the concepts of the invention.

DETAILED DESCRIPTION OF THE INVENTION

Figure 1:
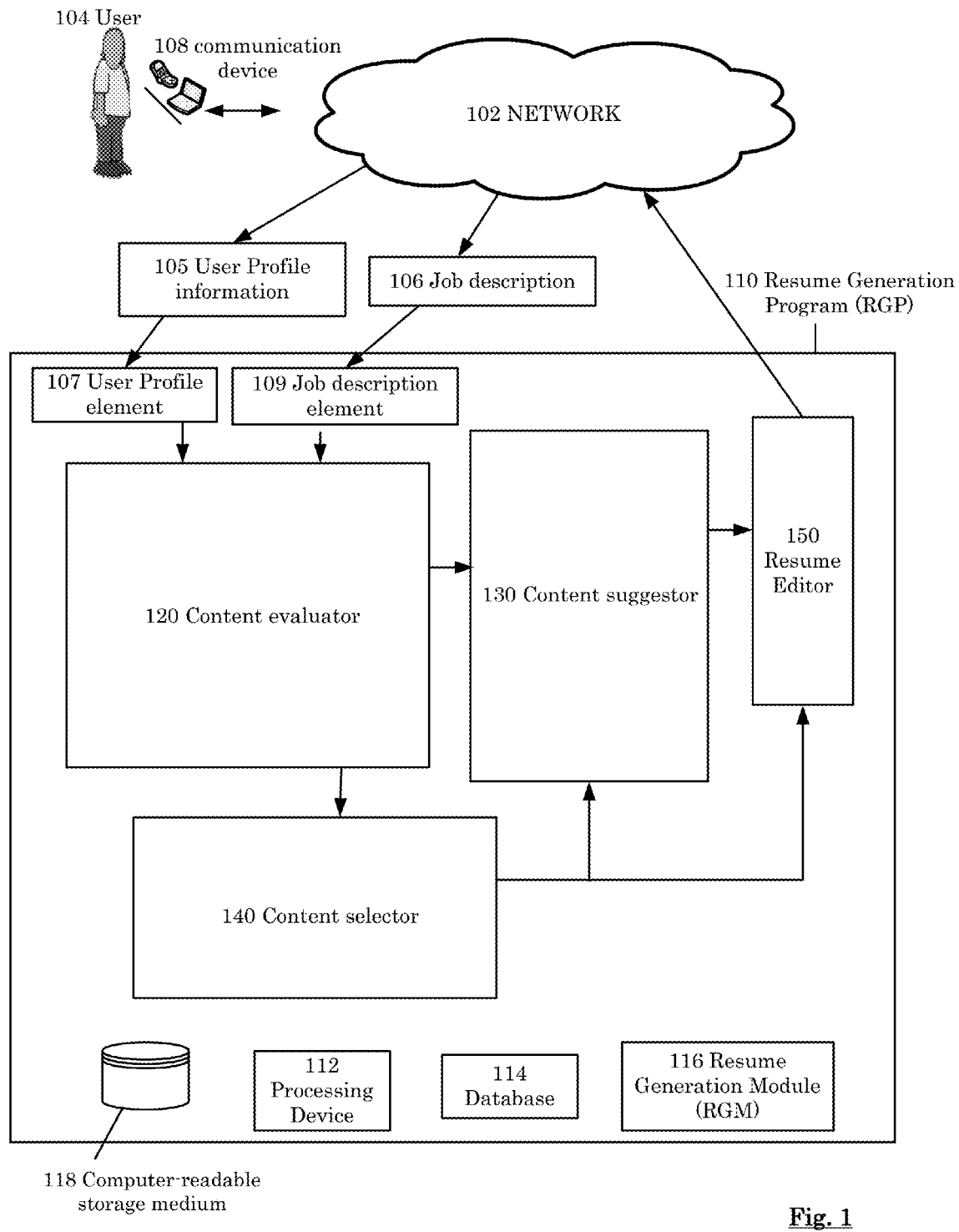
FIG. 1 shows a high level architecture of a system for improving a resume according to a job description according to an embodiment of the present invention.

FIG. 1 illustrates a block diagram of an environment including a resume generation program (RGP) 110 for improving a resume according to a job description 106 in accordance with an embodiment of the present invention. In an embodiment, the RGP 110 may generate, build, modify, and/or update a resume. It should be readily apparent to those of ordinary skill in the art that system depicted in FIG. 1 represents a generalized schematic illustration and that other components may be added or existing components may be removed or modified. Moreover, the system may be implemented using software components, hardware components, or combinations thereof.

As shown in FIG. 1, the RGP 110 receives professional user profile information 105 to create a base professional/work history profile. As used herein, professional user profile information includes, but is not limited to, a written summary which accounts for one's professional or work experience and qualifications. In addition, the RGP 110 may receive one or more job descriptions 106 for particular jobs that the user 104 is interested in applying to. A job description includes, but is not limited to, one or more characteristics, keywords, and/or phrases, parameters, and/or other information describing and/or relating to a job opportunity opening. In an embodiment, the RGP 110 may retrieve the job description 106 from a career service. In an embodiment, the RGP 110 may enable the user 104 to interact with a resume editor 150 that displays the most relevant content from the base professional/work history profile for the job description 106 and allows the user 104 to edit the resume. In an embodiment, the RGP 110 may input the user profile information 105 and job description 106 into a content evaluator 120, content selector 140, and content suggestor 130 for further operations as described below.

In an embodiment, the content evaluator 120 is a module configured to receive user profile elements 107 of user profile information 105 and job description elements 109 of the job description 106, and determine the relevancy of each user profile elements 107 for the job description 106, based on job description elements 109, as well as an aggregate relevancy score of the user profile elements 107 for the job description 106, and then outputs relevancy score information appended to each user profile element 107, as shown in FIG. 1. A user profile element 107 may be a sentence or combination thereof (unstructured text) that is a component of a user's job history, including, but not limited to, a user's contact information, geographic location, education, job objective, and professional work history. A job description element 109 may be a sentence or combination thereof (unstructured text) that is a component of a job description 106, including, but not limited to, an essential job function, required knowledge and critical skills, minimum education, physical demands, location, environmental factors, desired experience, and any explanatory information that may be necessary to clarify job duties or responsibilities.

In an embodiment, the content selector 140 is a module configured to receive data from the content evaluator 120. Such data includes, but is not limited to, data with respect to the user profile elements 107, the job description elements 109, and the relevancy score information from the content evaluator 120. In an embodiment, the content selector 140 may select certain user profile elements 109 which may be included or may be suggested to be included in a resume.

In an embodiment, the content suggestor 130 is a module configured to receive data from the content evaluator 120 and from the content selector 140. Such data includes, but is not limited to, data with respect to the user profile elements 107, the job description elements 109, and the relevancy score information from the content evaluator 120 and the user profile elements 107 that have been selected to be included in a resume from the content selector 140.

In an embodiment, the RGP 110 may be implemented on a processing device 112. The processing device 112 may be, for example, a server for generating a resume according to a job description 106. As used herein, the term "processing device" is intended to include, but is not limited to, a programmable electronic machine that performs executes software to perform several operations such as assemble, store, correlate, or otherwise processes information.

The RGP 110 includes a database 114 for containing and storing a plurality of user profile information 105, job descriptions 106, user profile elements 107 and job description elements 109. As used herein, the term "database" is intended to include, but is not limited to, a repository for containing and storing data.

The RGP 110 also includes a computer-readable storage medium (e.g., a hard drive) 118, a resume generation module 116 ("RGM 116"), and a wireless device and/or an Internet interface (not shown) that allows for communication with any type of consumer device. As used herein, the RGM 116 is intended to include, but is not limited to, a computer program including one or more sets of instructions provided to implement the methods 500 and 600, described below. In an embodiment, the RGM 116 may be implemented by a processing device 112 and configured for improving a resume according to a job description 106. In another embodiment, RGM 116 resides on the computer-readable storage medium (e.g., a hard drive) 118.

The computing environment comprises a network 102 (e.g., the Internet, or the wired or wireless telephone network), which may be any type of communications medium that allows for the professional user profile information 105 to be communicated between the RGP 110 and the user 104, as shown in FIG. 1.

The RGP 110 is configured to communicatively connect to one or more communication devices 108 associated with the user 104 via the network 102. The communication device 108 is intended to include, but is not limited to, any device capable of communicating with the RGP 110 via the network 102 including, but not limited to a computer, a smart phone, a wireless device, a tablet, and/or any suitable computing device. In an embodiment, the communication device 108 is a mobile device (e.g., a handheld device, smart phone or web portal device) that communicates with the network 102 via a wireless connection.

The RGP 110 may also include a computer-readable storage medium or hard drive 118 for storing the database 114 and a wireless device and/or an Internet interface (not shown) that allows for communication with any type of consumer device. In an embodiment, the RGP 110 includes a processing device 112 (e.g., a processor) that executes one or more computer software programs configured to perform the functions described in detail below with reference to FIGS. 5 and 6.

Figure 2:
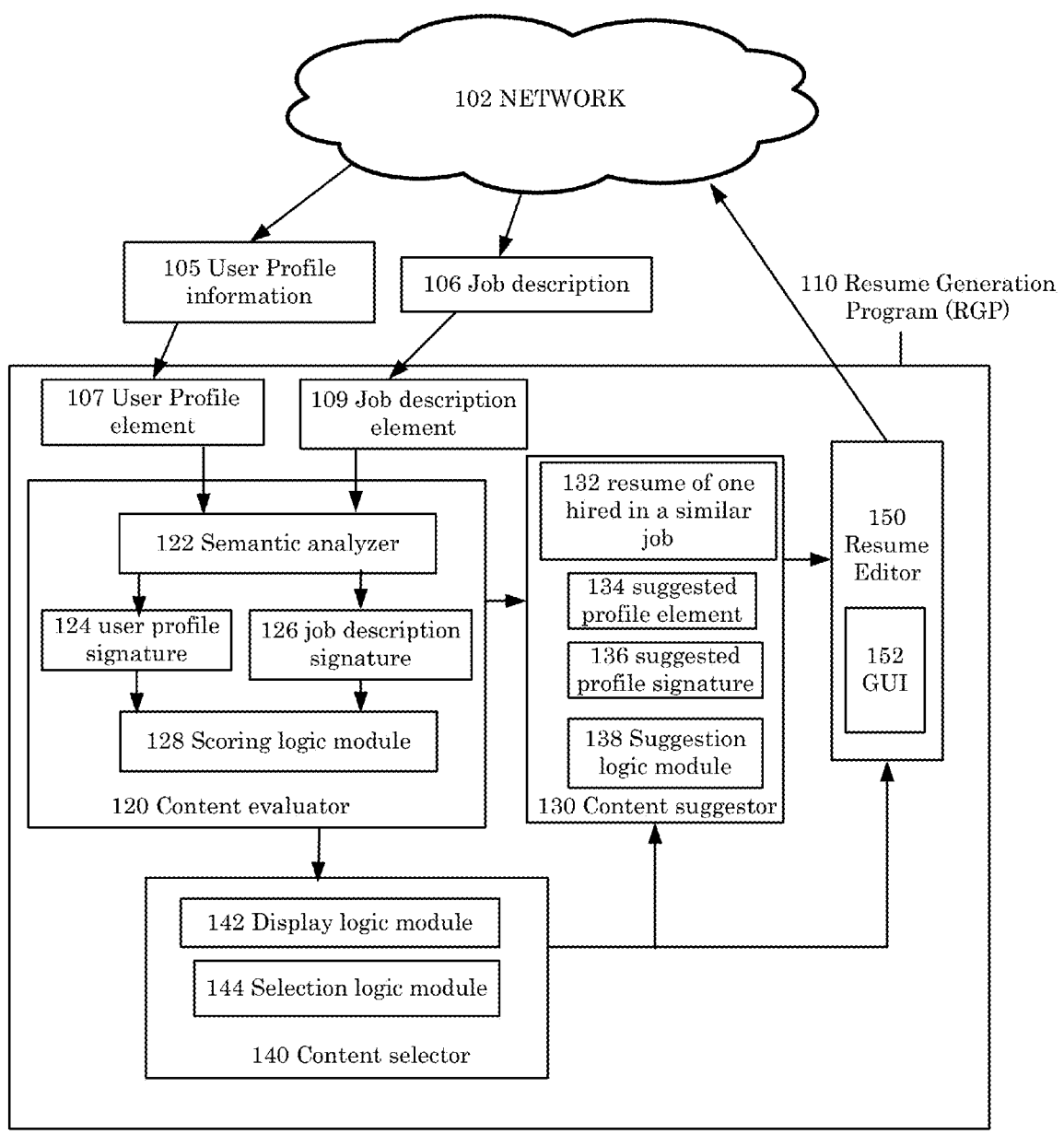
FIG. 2 shows a system architecture for improving a resume according to a job description according to an embodiment of the present invention.

FIG. 2 shows an example implementation of the content evaluator 120, content suggestor 130, content selector 140, and resume editor 150, according to an embodiment of the present invention. In an embodiment, the content evaluator 120 receives a profile element 107 and a job description element 109 and directs the elements through a semantic analyzer 122. A semantic analyzer 122 is a trained system that may receive text and represent them as vectors in term space, may identify the top topics and concepts in a piece of text, based on context, and represent the text in the form of a semantic signature (e.g., user profile signature 124 and job description signature 126). A semantic signature, which may be derived from the profile element 107 and/or the job description element 109, includes, but is not limited to, a key word or a series of key words indicating the most prevalent topics and concepts from the respective element. The semantic signature may be a multi-dimension vector of concepts and weights succinctly representing text. The semantic signature of each user profile element 107 may be compared to the semantic signature of the job description element 109 (e.g., user profile signature 124 may be compared to job description signature 126). In an embodiment, the scoring logic module 128 may include one or more sets of instructions for determining a relevancy score to indicate how relevant the user profile element 107 is for the job description element 109. A relevancy includes, but is not limited to, a numerical indicator on a finite scale of numerical indicators. In an embodiment, the relevancy score may be assigned to each user profile element 107. In an embodiment, the relevancy score may be calculated as the sum of the products of the weights of the intersecting dimensions of the user profile signature 124 and the job description signature 126. Following is exemplary code to illustrate the scoring mechanism:

```
relevancy score = 0.0;
for (dimension in profile signature) {
    if (dimension in job description signature) {
        relevancy score += profile signature [dimension] *
job description signature[dimension];
    }
}
return relevancy score.
```

While this scoring algorithm may provide a reasonable relevancy score, the scoring algorithm may be implemented as a trainable algorithm that can take in more signals such as user scoring and selection corrections, keyword matches, personalization, etc. to increase accuracy and one having ordinary skill in the art will appreciate that types of additional signals that may be used.

In an embodiment, the user can edit the profile elements 107 with low relevancy score in the resume editor 150 graphical user interface (GUI) 152 to see the change in the relevancy score for that profile elements 107 and the aggregate relevancy score, as they type. New profile elements 107 can be created by the user similarly to increase the aggregate relevancy score.

In an embodiment, the content selector 140 receives the user profile elements 107 of a base professional/work history profile appended with relevancy information (in other words, the output of the content evaluator) for the job description 106, and defines a relevancy score limit or threshold. The relevancy score limit includes, but is not limited to, a numerical indicator which is a threshold for determining whether a specific user profile element 107 is selected to be included in a resume, hence leading to a set of user profile elements 107 or profile subset that may be included in a resume, as displayed on a graphical user interface (GUI) 152 shown in FIG. 2.

According to an embodiment of the present invention, in the implementation illustrated in FIG. 2, the content selector receives the output of the content evaluator 120 (e.g., the user profile elements 107 and appended records with respective relevancy scores). Based on the relevancy scores and parameters set by the user 104, such as, for example desired number of pages for a resume, the display logic module 142 and the selection logic module 144 may determine the relevancy score limit or threshold. Using that relevancy score threshold and further parameters set by the user 104, such as, for example whether they care to always have their entire education listed in a resume and whether they want no experience gaps in their resume, it may be determined whether or not to select each user profile elements 107 into a resume and display it on the GUI 152 of the resume editor 150. Following is an example process.

In an embodiment, the content selector 140 may create a list of relevancy scores of user profile elements 107. This list may include the relevancy score of the profile element, the domain object model (DOM) id of user profile element 107 to be displayed, the user profile element's 107 "show" attribute (true/false), and the user profile element's 107 display order. The DOM id includes, but is not limited to, a reference to a specific part of a web page. In an embodiment, the user profile element's 107 display order may be defined by the user 104. The content selector 140 may sort the list of relevancy scores of user profile elements 107 by, for example, the least score to greatest score and determine the desired length of the resume, for example, the number of pages of the resume multiplied by the length of one page in pixels.

The content selector 140 may iterate a process over the sorted list of relevancy scores from the first user profile element 107 to the last. Such process may include displaying all the user profile elements 107 in the list on the resume editor 150. If the display of all of the user profile elements 107 in the list can be displayed within the desired length of the resume, then the process ends. However, if the display of all of the user profile elements 107 in the list exceeds what can be displayed within the desired length of the resume, then the content selector 140 removes the user profile element 107 with the lowest relevancy score from the display. This process continues until the list of remaining profile elements 107 can be displayed within the desired length of the resume.

In an embodiment, the content suggestor 130 receives the job description 106 and the user profile elements 107 appended with relevancy information (i.e., the output from the content evaluator 120), and identifies similar profile elements 107 from, for example, other users on the system or on external systems that are more relevant (e.g., have higher relevancy scores), and outputs them as a suggested profile element 134 for each user profile element 107, as shown in FIG. 1.

The content suggestor 130 may receive, from a database, resume profiles or resumes of others hired in a job similar to the job description 132 as a source for content for recommendations and suggested profile elements 134 and suggested profile signatures 136. A suggested profile element 134 may be a component of a person's job history, including, but not limited to, a user's education, job objective, summary, professional work history and skills, wherein the person having been already hired in a job similar to the job description 132. A suggested profile signature 136 may be derived from the suggested profile element 134 includes, but is not limited to, a key word or a series of key words or multi-dimensional vector indicating the most prevalent topics and concepts from the suggested profile element 134.

An example database from which the content suggestor 130 may receive resume profiles or resumes includes, but is not limited to large professional networking sites such as LinkedIn™, which have several professional profiles and may serve as a good source of such resumes. The RGP 110 described herein may build up a pool of profiles from its users—the advantage of using this pool is that the profile element records already have associated semantic signatures (e.g., suggested profile signatures 136) which may be utilized in the implementation as illustrated in FIG. 2.

In an embodiment, the suggestion logic module 138 may include one or more sets of instructions for a suggestion algorithm which determines whether a suggested profile element 134 should be included in a resume. For example, for a user profile element 107 that is not too relevant for the job description 106, the content suggestor 130 uses the user profile element's 107 semantic signature (i.e., the user profile signature 124) to identify other profile elements with the closest semantic signatures from its pool of suggested profile elements 134 across various other users. The semantic signatures of these suggested profile elements 134 (i.e., the suggested profile signatures 136) are then compared to the semantic signature of the job description 106 (i.e., the job description signature 126) to compute relevancy scores (as described above relating to the scoring algorithm in the content evaluator 120), and those suggested profile elements 134 with higher relevancy scores may be shown as suggested profile elements 134 for the resume editor 150.

In an embodiment, if the company name and job title name of the job description 106 is available to the content suggestor 130, the content suggestor 130 may use such information to look up other user profiles (i.e., suggested profile elements 134) containing that company and job title name. These identified profiles may represent people who currently or in the past held the same or a similar job as the job that the user 104 desires to obtain. In an embodiment, the suggested profile elements 134 may be provided as content suggestions or alternatives.

According to an embodiment of the present invention, the content suggestor 130 is configured to identify what kind of information may be missing from a resume for the job description 106, based on a comparison of the semantic signatures of the user profile elements 124 and the job description 106. If, for instance, some of the top concepts and topics in the semantic signature of the job description 106 (e.g., requisites and desirable skills in the job description) are not found in the semantic signatures of the user profile elements 107, these concepts may be displayed to the user 104 so that the user 104 may know what kind of information is missing from his or her resume for that job description 106 and may accordingly add content to the resume, or can be used to identify coursework or classes that will offset what the user is missing in their resume.

Figure 4A:
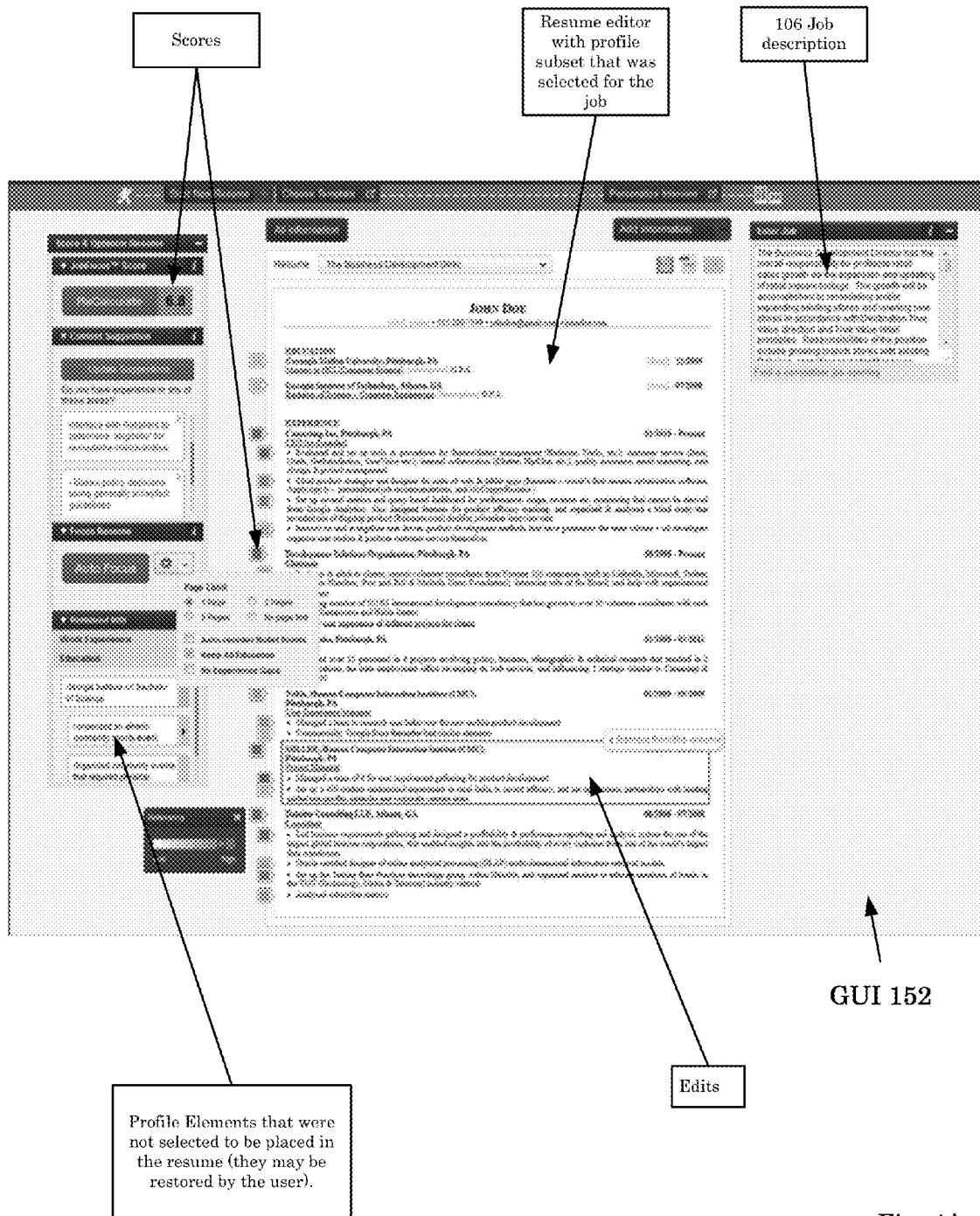
FIGS. 4A and 4B show screen shots of a graphical user interface for improving a resume according to a job description according to an embodiment of the present invention.
Figure 4B:
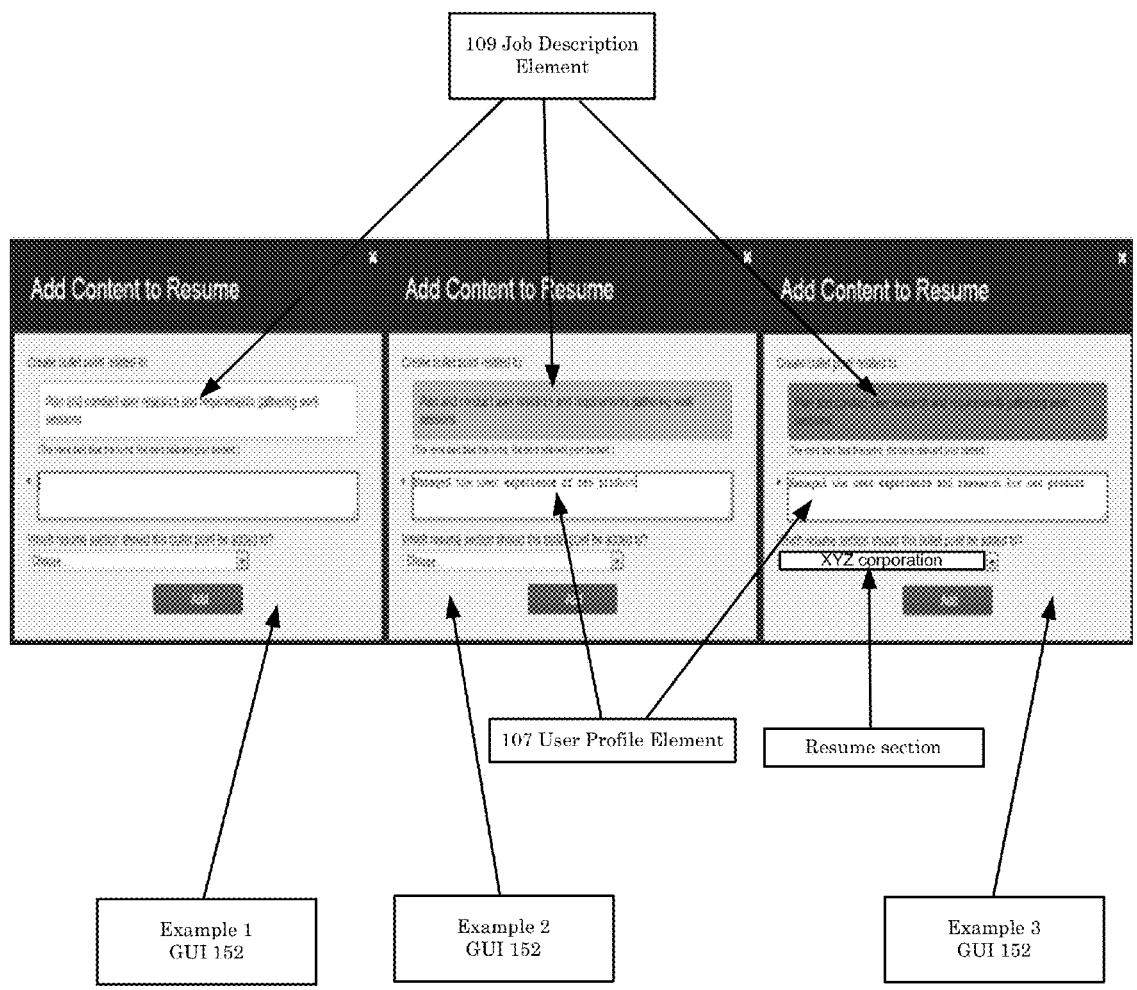

Embodiments of the present invention include a GUI 152 as shown in FIGS. 3, 4A, and 4B. The user 104 may first create a profile by adding content such as sentences about what they have accomplished in previous work experiences (FIG. 3). In an embodiment, the RGP 110 may treat each of these sentences as different user profile elements 107. In an embodiment, the RGP 110 may parse an existing resume of the user 104 to generate the different profile elements 107. The user 107 may then copy the description of a job they are interested in (for instance, from a job board) and paste it into the RGP 110 as shown in FIG. 4A. Upon clicking a button (e.g., the "Auto Focus" button in FIG. 4A), the RGP 110 may select those Profile Elements (either the user profile elements 107 or the suggested profile elements 134) that rank highest based on the job description 106 and that can fit in a desired resume page length. The GUI 152 may display the profile elements in a desired resume format or template in the resume editor 150 (FIG. 4A). The RGP 110 may restore into the resume any of the profile elements that were earlier removed (e.g., by the "Removed Info" button as illustrated in FIG. 4A) or remove profile elements that were selected by the content selector 140, based on receiving information from the user 104. The RGP 110 may determine a score of how well the user's 104 resume on the resume editor is focused for the desired job (e.g., the "JobFocus" Score as illustrated in FIG. 4A). In an embodiment, each profile element may have an indicator of how relevant it is for the desired job, and the resume editor 150 may receive instructions from user 104 to edit or paraphrase profile elements with low indicators and evaluate if the edit is better or not based on a change in the score. The RGP 110 may also provide the user 104 with information about what is missing from their resume, and recommendations of similar terminology for their profile elements and prior job titles that are more relevant to the desired job, and the user 104 may instruct the RGP 110 to use those instead (not shown in FIG. 4A).

FIG. 4B illustrates three progressive example displays of GUI 152. In FIG. 4B, Example 1, the GUI 152 displays a text box that includes bullet point from a job description element 109, e.g., "Plan and conduct user research and requirements gathering work sessions" which is missing or doesn't have corresponding information in the resume. An interactive text box may be located below the job description element for the user 104 to include his or her profile element 107. In FIG. 4B, Example 1, the user 104 has not yet inserted a profile element 107 into the interactive text box. As such, the text box that includes bullet point from a job description element is absent of any color or shaded fill.

In FIG. 4B, Example 2, the GUI 152 displays a user profile element 107 such as "Managed the user experience of the new product" entered by the user. The RGP 110 determines the strength of a match between this user profile element 107 and the job description element 109. In an embodiment, the strength of the match may be reflected in a shading of the text box that includes bullet point from the job description element 109. In FIG. 4B, Example 3, the GUI 152 displays a user profile element 107 such as "Managed the user experience and research for the new product" that has been edited by the user. The RGP 110 determines that the strength of the match between this user profile element 107 and the job description element 109 is greater than the strength as described in FIG. 4B, Example 2. Accordingly, the shading of the text box that includes bullet point from the job description element 109 is darker in Example 3. FIG. 4B, Example 3 also illustrates a resume section of the user's resume for which this user profile element 107 may be added, e.g., XYZ corporation. One skilled in the art will appreciate that the above examples are not intended to be limiting to embodiments of the invention and that other GUI 152 displays may be utilized to achieve various embodiments of the invention.

Figure 5:
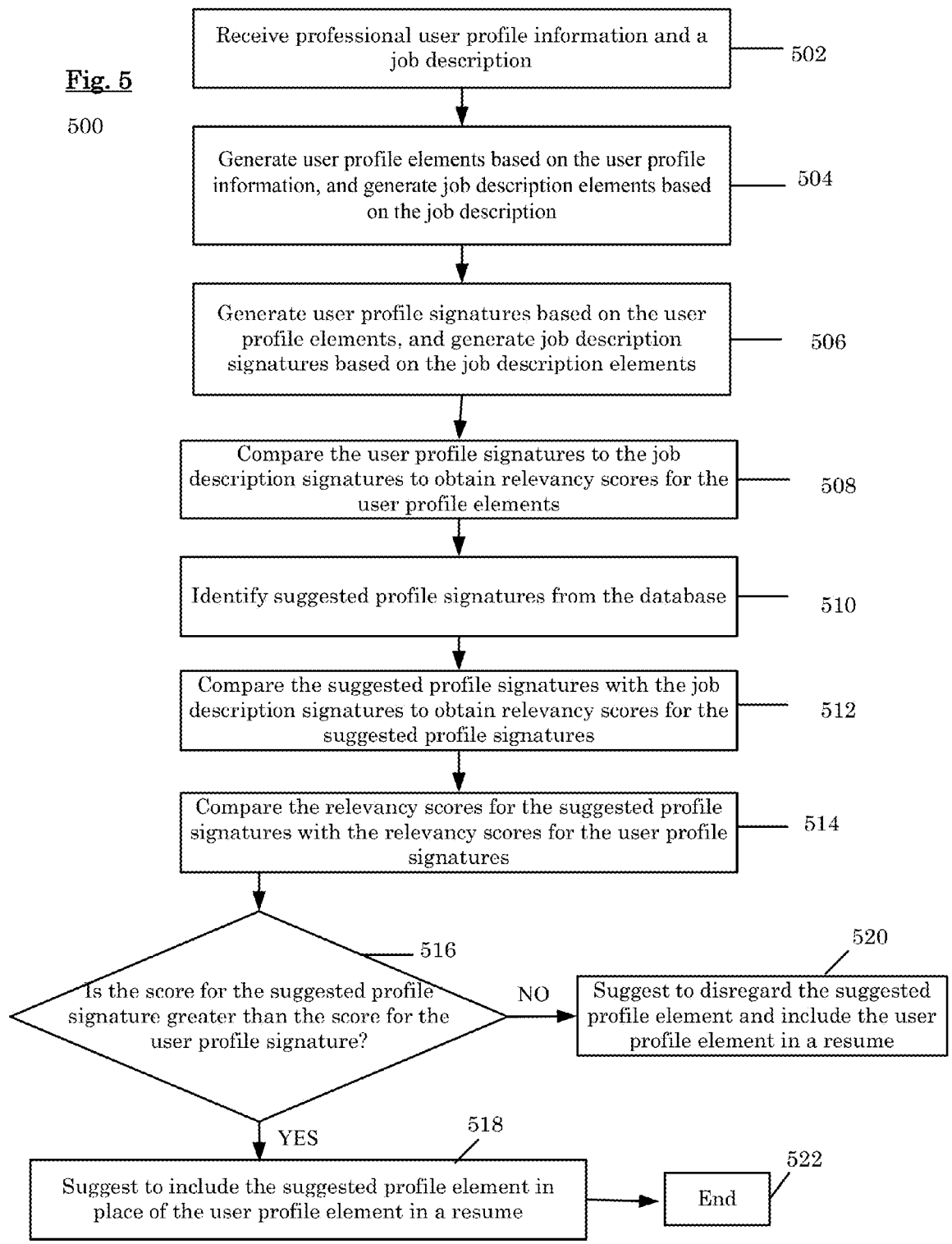
FIG. 5 is a flow diagram of a method for a system and method for improving a resume according to a job description in accordance with embodiments of the present invention.
Figure 6:
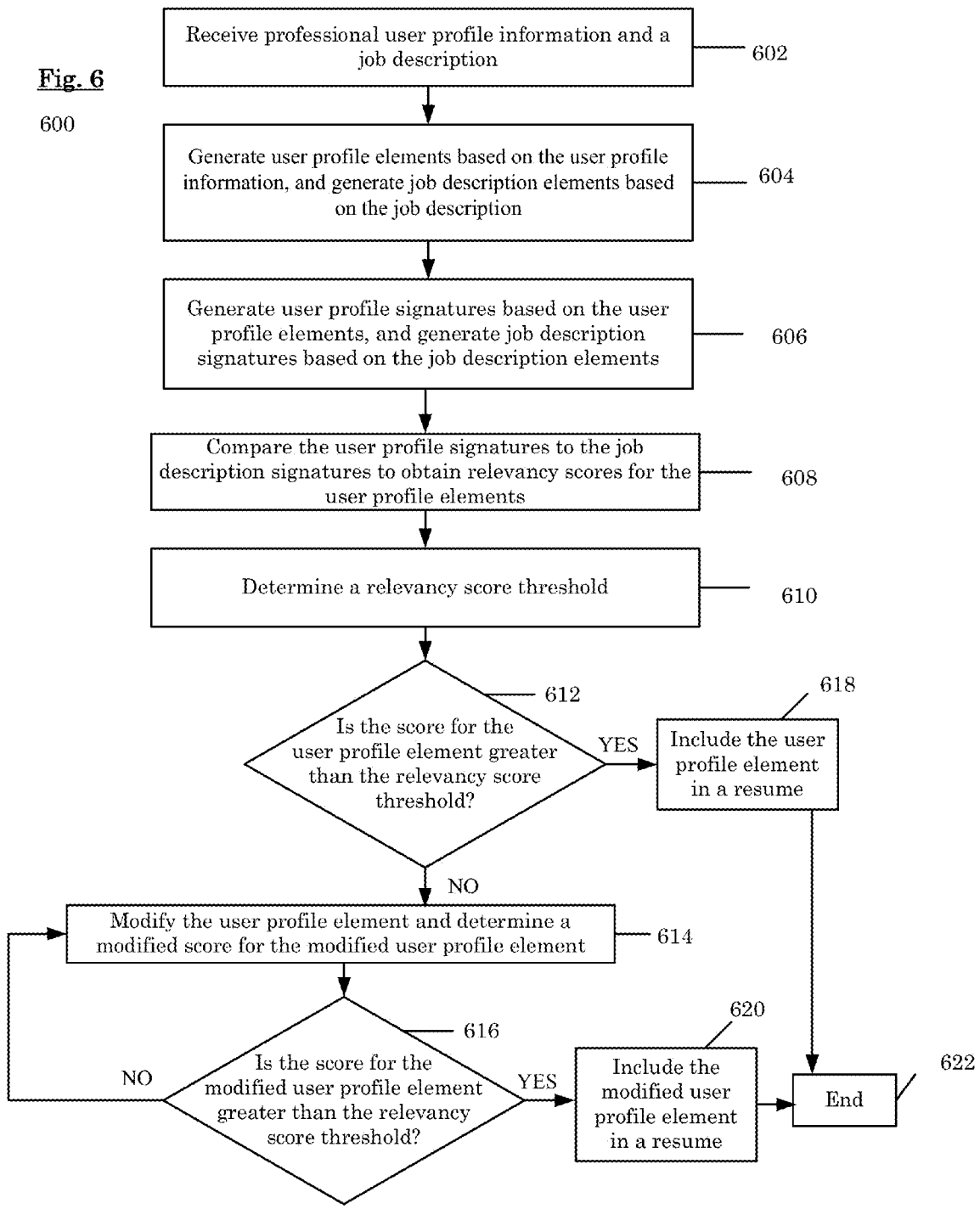
FIG. 6 is a flow diagram of a method for a system and method for improving a resume according to a job description in accordance with embodiments of the present invention.

FIGS. 5 and 6 illustrate methods 500 and 600, respectively, for improving a resume according to a job description. In an embodiment, a system (e.g., RGP 110 including RGM 116, as shown in FIGS. 1 and 2) is provided to implement the methods 500 and 600.

In FIG. 5, block 502, the RGP 110 receives professional user profile information 105 and a job description 106 from a source (e.g., a communication device 108 associated with a user 104) via a network 102. In block 504, the RGP 110 generates user profile elements 107 based on the user profile information 105, and generates job description elements 109 based on the job description 106. In block 506, the RGP 110 generates user profile signatures 124 based on the user profile elements 107, and generates job description signatures 126 based on the job description elements 109.

In block 508, the RGP 110 compares the user profile signatures 124 to the job description signatures 126 to obtain relevancy scores for the user profile elements 107. In block 510, the RGP 110 identifies suggested profile signatures 136 from the database 114. In block 512, the RGP 110 compares the suggested profile signatures 136 with the job description signatures 126 to obtain relevancy scores for the suggested profile signatures 136. In block 514, the RGP 110 compares the relevancy scores for the suggested profile signatures 136 with the relevancy scores for the user profile signatures 124.

In block 516, if the relevancy score for the suggested profile signature 136 is greater than the relevancy score for the user profile signature 124, then in block 518 the RGP 110 suggests paraphrase the user profile element 107 to be like the suggested profile element 134 or include the suggested profile element 134 instead of the user profile element 107 in a resume and the process ends at block 522. If in block 516 the relevancy score for the suggested profile signature 136 is less than or equal to the relevancy score for the user profile signature 124, then in block 520 the RGP 110 suggests to disregard the suggested profile element 134 and include the user profile element 107 in a resume, and the process ends at block 522.

In FIG. 6, block 602, the RGP 110 receives professional user profile information 105 and a job description 106 from a network 102 or from a communication device 108 associated with a user 104. In block 604, the RGP 110 generates user profile elements 107 based on the user profile information 105, and generates job description elements 109 based on the job description 106. In block 606, the RGP 110 generates user profile signatures 124 based on the user profile elements 107, and generates job description signatures 126 based on the job description elements 109.

In block 608, the RGP 110 compares the user profile signatures 124 to the job description signatures 126 to obtain relevancy scores for the user profile elements 107. In block 610, the RGP 100 determines a relevancy score threshold. In block 612, the RGP 110 determines whether the relevancy score for the user profile element 107 is greater than the relevancy score threshold. If the relevancy score for the user profile element 107 is greater than the relevancy score threshold, then in block 618 the user profile element 107 is included in a resume and the process ends at block 622.

If in block 612 the relevancy score for the user profile element 107 is not greater than the relevancy score threshold, then in block 614 the user 104 modifies the user profile element 107, upon which the RGP 110 generates a modified user profile signature and compares the modified user profile signature to the job description signature 126 to obtain generate a modified relevancy score for the modified user profile element. In block 616, RGP 110 determines whether the relevancy score for the modified user profile element is greater than the relevancy score threshold. If the modified relevancy score is still not greater than the relevancy score threshold, then in block 614 the user 104 modifies the user profile element 107 (or modifies the modified user profile element) in another attempt to improve the user profile element so that it is greater than the relevancy score threshold. This may be repeated until the modified relevancy score is greater than the relevancy score threshold, upon which in block 620 the modified user profile element is included in a resume and the process ends at block 622.

One having ordinary skill in the art will appreciate that embodiments of the present invention may be used by job-seekers irrespective of industry or how far they are in their career (students included). Other similar users are career counselors, resume writers, transition or outplacement services personnel, employment agencies, HR personnel and the like. Embodiments of the present invention allow users to apply to job opportunities smartly, hence landing more interviews.

In addition, one having ordinary skill in the art will appreciate that embodiments of the present invention can be used beyond tailoring resumes for a job opportunity to evaluate and focus any form of unstructured content against other unstructured content to improve it. For example, in tailoring a cover letter for a job, an essay for a college or scholarship application, a business plan for a competition or angel forum, a submission for an RFP, and so on.

Figure 7:
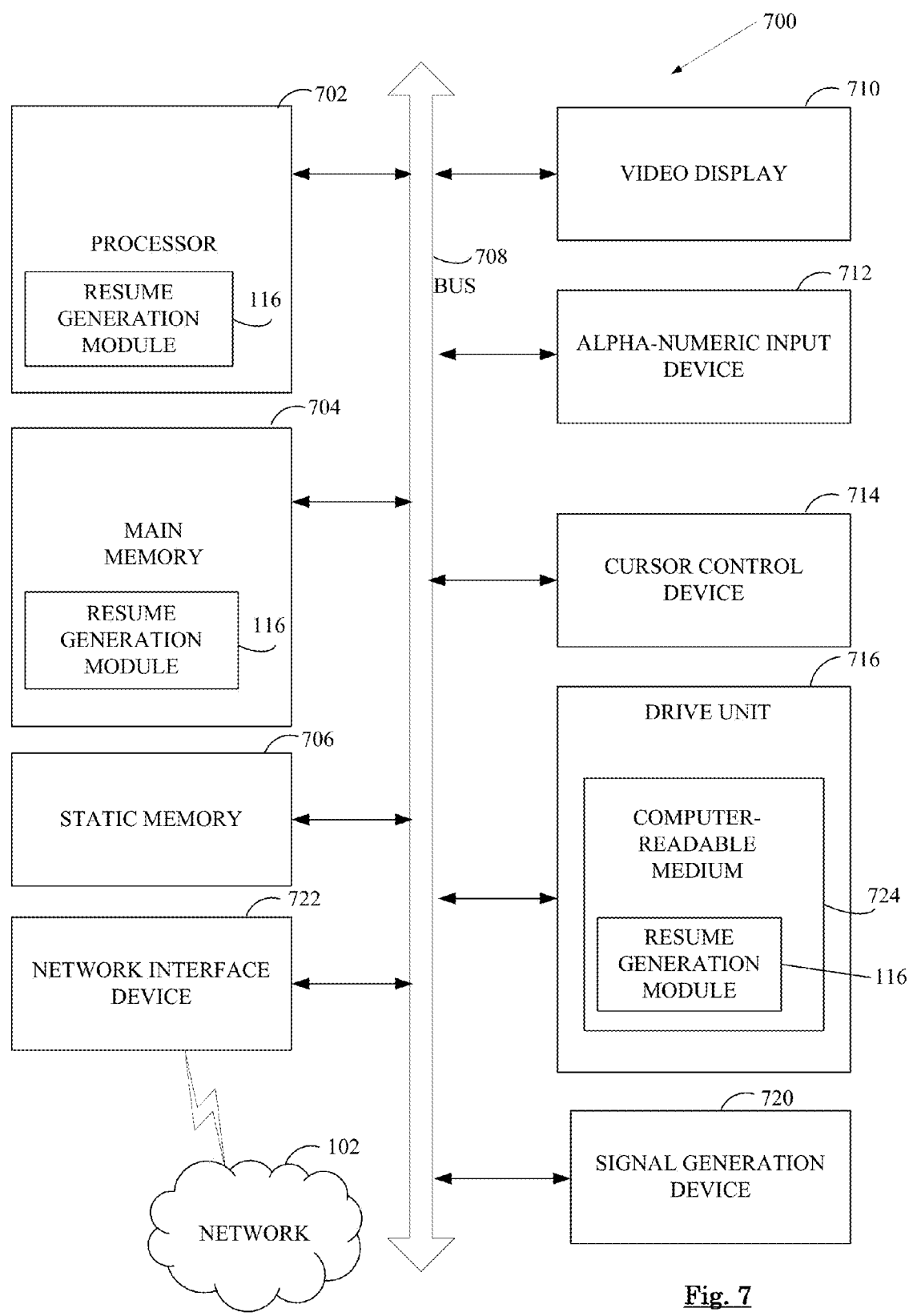
FIG. 7 is a block diagram of a computer system that may perform one or more of the operations described herein.

FIG. 7 illustrates a diagrammatic representation of a machine in the form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 708.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions for performing the operations and steps discussed herein, illustrated in FIG. 7 by depicting instructions for RGM 116 within processor 702.

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 718 may include a computer-readable storage medium 724 on which is stored one or more sets of instructions (e.g., RGM 116) embodying any one or more of the methodologies or functions described herein. The RGM 116 may also reside, completely or at least partially, within the main memory 704 and/or within the processor 702 during execution thereof by the computer system 700, the main memory 704 and the processor 702 also constituting computer-readable storage media. The instructions for RGM 116 may further be transmitted or received over a network 102 via the network interface device 722.

While the computer-readable storage medium 724 is shown in an embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The foregoing description, for purposes of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "generating", "receiving", "associating", "comparing", "determining", "identifying", and "transmitting", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:

generating, by a processing device, a first user profile signature based on a first user profile element associated with a user, the first user profile signature comprising a plurality of vectors, wherein each vector comprises a topic and a respective weight that identifies a relevancy for the topic, and wherein the first user profile element comprises unstructured text;

generating, by the processing device, a first job description signature based on a first job description element associated with a job description;

comparing the first user profile signature with the first job description signature;

determining a first score indicating a strength of a match between the first user profile element and the job description based on the comparing the first user profile signature with the first job description signature;

determining a relevancy score threshold indicating whether to include the first user profile element in a resume;

comparing the first score to the relevancy score threshold; and updating, by the processing device, a resume associated with the first user, wherein the updating comprises parsing, by the processing device, the resume associated with the first user and including, by the processing device, the first user profile into the parsed resume.

2. The method of claim 1, further comprising:

identifying a first suggested profile signature from a database, the first suggested signature associated with a first suggested profile element associated with a person who was hired for a job similar to the job description;

comparing the first suggested profile signature with the first job description signature to determine a first suggested score indicating a strength of a match between the first suggested profile element and the job description; and generating a suggestion to include the first suggested profile element in a resume if the first suggested score is greater than the first score.

3. The method of claim 2, wherein identifying the first suggested profile signature from the database is based on at least one of a company name or a job title.

4. The method of claim 1, further comprising:
modifying the first user profile element if the first score does not exceed the relevancy score threshold;
generating a modified first user profile signature based on the modified first user profile element;
comparing the modified first user profile signature with the first job description signature to determine a modified first score indicating a strength of a match between the modified first user profile element and the job description; and
generating a resume comprising the modified first user profile element if the modified first score exceeds the relevancy score threshold.

5. The method of claim 1 wherein the relevancy score threshold is determined based on an available space for the resume.

6. The method of claim 5, wherein the available space for the resume comprises a desired number of pages for the resume.

7. The method of claim 1, further comprising:
generating a second user profile signature based on a second user profile element associated with the user;
generating a second job description signature based on a second job description element associated with the job description;
comparing the second user profile signature with the second job description signature to determine a second score indicating a strength of a match between second user profile element and the job description;
determining a first importance weighting factor for the first user profile element and a second importance weighting factor for the second user profile element; and
determining an aggregate relevancy score based on the first and second scores and the first and second importance weighting factors, the aggregate relevancy score indicating a strength of a match between the first and second user profile elements and the job description.

8. The method of claim 7, further comprising:
determining a rank order of the first user profile element and the second user profile element based on the first and second scores and the first and second importance weighting factors; and
including the first user profile element or the second user profile element in a resume based on the rank order.

9. The method of claim 7, wherein the aggregate relevancy score is a product of the first importance weighting factor and the first score plus a product of the second importance weighting factor and the second score.

10. A system comprising:
a resume generation program comprising a processing device, the resume generation program communicatively connected via a network to a communication device, wherein the resume generation program is configured to:
generate, by the processing device, a first user profile signature based on a first user profile element associated with a user, the first user profile signature comprising a plurality of vectors, wherein each vector comprises a topic and a respective weight that identifies a relevancy for the topic, and wherein the first user profile element comprises unstructured text,
generate a first job description signature based on a first job description element associated with a job description,
compare the first user profile signature with the first job description signature;
determine a first score indicating a strength of a match between the first user profile element and the job description based on the compare the first user profile signature with the first job description signature;
determine a relevancy score threshold indicating whether to include the first user profile element in a resume;
compare the first score to the relevancy score threshold; and
update a resume associated with the first user, wherein the update comprises parse the resume associated with the first user and include the first user profile into the parsed resume.

11. The system of claim 10, further comprising:
modify the first user profile element if the first score does not exceed the relevancy score threshold,
generate a modified first user profile signature based on the modified first user profile element,
compare the modified first user profile signature with the first job description signature to determine a modified first score indicating a strength of a match between the modified first user profile element and the job description, and
generate a resume comprising the modified first user profile element if the modified first score exceeds the relevancy score threshold.

12. The system of claim 10, further comprising:
generate a second user profile signature based on a second user profile element associated with the user,
generate a second job description signature based on a second job description element associated with the job description,
compare the second user profile signature with the second job description signature to determine a second score indicating a strength of a match between second user profile element and the job description,
determine a first importance weighting factor for the first user profile element and a second importance weighting factor for the second user profile element, and
determine an aggregate relevancy score based on the first and second scores and the first and
second importance weighting factors, the aggregate relevancy score indicating a strength of a match between the first and second user profile elements and the job description.

13. The system of claim 12, further comprising:
determine a rank order of the first user profile element and the second user profile element based on the first and second scores and the first and second importance weighting factors, and
include the first user profile element or the second user profile element in the resume based on the rank order.

14. The system of claim 12, wherein the aggregate relevancy score is a product of the first importance weighting factor and the first score plus a product of the second importance weighting factor and the second score.

15. The system of claim 10 wherein the relevancy score threshold is determined based on an available space for the resume.

16. The system of claim 15, wherein the available space for the resume comprises a desired number of pages for the resume.

17. A non-transitory computer readable storage medium comprising data that, when executed by a processing device, causes the processing device to execute operations comprising:

generating, by the processing device, a first user profile signature based on a first user profile element associated with a user, the first user profile signature comprising a plurality of vectors, wherein each vector comprises a topic and a respective weight that identifies a relevancy for the topic, and wherein the first user profile element comprises unstructured text;

generating a first job description signature based on a first job description element associated with a job description;

comparing the first user profile signature with the first job description signature;

determining a first score indicating a strength of a match between the first user profile element and the job description based on the comparing the first user profile signature with the first job description signature;

based on the comparing the first user profile signature with the first job description signature;

determining a relevancy score threshold indicating whether to include the first user profile element in a resume;

comparing the first score to the relevancy score threshold; and updating, by the processing device, a resume associated with the first user, wherein the updating comprises parsing, by the processing device, the resume associated with the first user and including, by the processing device, the first user profile into the parsed resume.

18. The non-transitory computer readable storage medium of claim 17, further comprising:

identifying a first suggested profile signature from a database, the first suggested signature associated with a first suggested profile element associated with a person who was hired for a job similar to the job description;

comparing the first suggested profile signature with the first job description signature to determine a first suggested score indicating a strength of a match between the first suggested profile element and the job description; and generating a suggestion to include the first suggested profile element in a resume if the first suggested score is greater than the first score.

* * * * *